(12) United States Patent
Malhotra

(10) Patent No.: US 11,864,277 B2
(45) Date of Patent: *Jan. 2, 2024

(54) WIRELESS COMMUNICATION NETWORK COMMUNICATIONS THROUGH SESSION COMMUNICATION PROXIES

(71) Applicant: T-MOBILE INNOVATIONS LLC, Overland Park, KS (US)

(72) Inventor: Rajil Malhotra, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,172

(22) Filed: Mar. 29, 2023

(65) Prior Publication Data

US 2023/0239964 A1 Jul. 27, 2023

Related U.S. Application Data

(63) Continuation of application No. 17/239,212, filed on Apr. 23, 2021, now Pat. No. 11,627,636.

(51) Int. Cl.
*H04W 80/10* (2009.01)
*H04W 88/18* (2009.01)
(Continued)

(52) U.S. Cl.
CPC ........... *H04W 80/10* (2013.01); *H04W 4/025* (2013.01); *H04W 28/24* (2013.01); *H04W 76/10* (2018.02); *H04W 88/182* (2013.01)

(58) Field of Classification Search
CPC ..... H04L 67/51; H04L 67/56; H04L 63/0281; H04L 67/562; H04L 12/189;
(Continued)

(56) References Cited

U.S. PATENT DOCUMENTS

| 10,819,636 | B1 | 10/2020 | Goel |
| 2003/0014367 | A1 | 1/2003 | Tubinis |

(Continued)

FOREIGN PATENT DOCUMENTS

| WO | 2020202043 A1 | 10/2020 |
| WO | 2021047551 A1 | 3/2021 |

(Continued)

OTHER PUBLICATIONS

Oracle Corporation; "Enablers for multiple SCPs (23.501)"; Apr. 20, 2020; 5 Pages; 3GPP TSG-SA2 Meeting #138-E; 3GPP; Sophia-Antipolis, France.

(Continued)

*Primary Examiner* — Awet Haile

(57) ABSTRACT

Session Communication Proxies (SCPs) generate SCP status information and/or SCP location information. A source network function selects one of the SCPs based on the SCP status information and/or the SCP location information. The source network function transfers data to the selected one of the SCPs. The selected one of the SCPs receives the data, selects a target network function, and transfers the data to the target network function. In some examples, a Network Repository Function (NRF) prioritizes the SCPs based on the SCP status information and/or the SCP location information, and the source network function selects the one of the SCPs based on the SCP prioritization.

20 Claims, 8 Drawing Sheets

(51) Int. Cl.
*H04W 28/24* (2009.01)
*H04W 4/02* (2018.01)
*H04W 76/10* (2018.01)

(58) Field of Classification Search
CPC ..... H04L 41/5058; H04L 67/60; H04L 63/10; H04L 65/1069; H04L 1/1854; H04L 65/1066; H04L 67/303; H04L 2209/76; H04W 48/16; H04W 48/18; H04W 80/10; H04W 88/182; H04W 28/0226; H04W 28/0942; H04W 12/63; H04W 4/029
See application file for complete search history.

(56) References Cited

U.S. PATENT DOCUMENTS

2021/0297935 A1* 9/2021 Belling .................. H04L 45/00
2022/0038545 A1* 2/2022 Krishan ................ H04L 67/563
2022/0248275 A1* 8/2022 Hallenstål ............. H04W 48/18
2022/0295384 A1* 9/2022 Gupta .................. H04W 88/06

FOREIGN PATENT DOCUMENTS

| WO | 2021160676 A1 | 8/2021 | |
|---|---|---|---|
| WO | WO-2021160676 A1 * | 8/2021 | ............ H04L 45/20 |
| WO | 2022083867 A1 | 4/2022 | |
| WO | WO-2022083867 A1 * | 4/2022 | |

OTHER PUBLICATIONS

CATT; "Add SCP profile and SCP information"; Jun. 2, 2020; 65 pages; 3GPP TSG-CT WG4 Meeting #98e; 3GPP; Sophia-Antipolis, France.

"3rd Generation Partnership Project; Technical Specification Group Services and System Aspects; System architecture for the 5G System (5GS); Stage 2 (Release 17)"; Apr. 2021; pp. 1-506; Draft 3GPP TS 23.501 V17.1.0; 3GPP; Sophia-Antipolis, France.

* cited by examiner

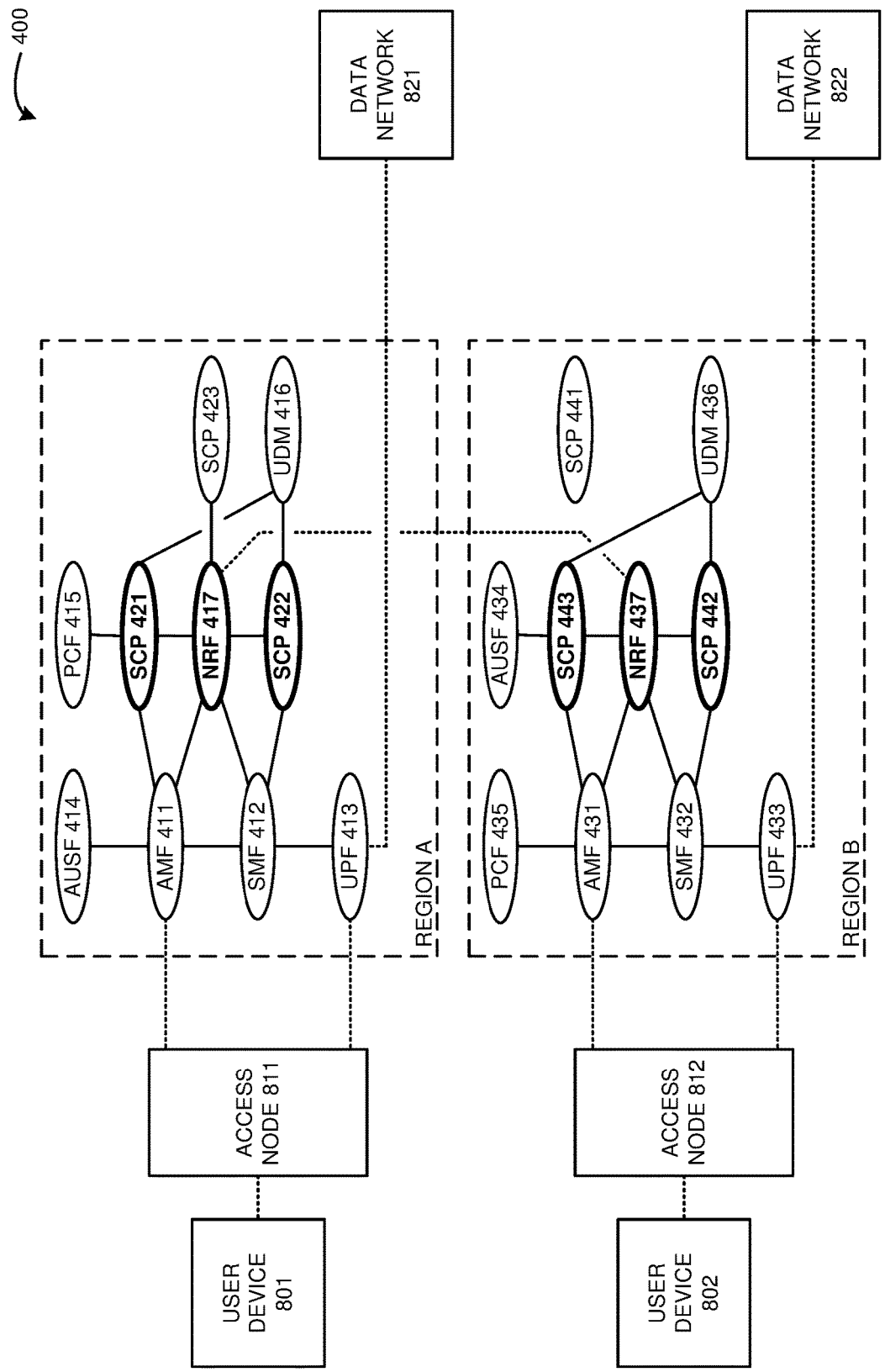

WIRELESS COMMUNICATION NETWORK COMMUNICATIONS THROUGH SESSION COMMUNICATION PROXIES

RELATED CASES

This United States Patent Application is a continuation of U.S. patent application Ser. No. 17/239,212 that was filed on Apr. 23, 2021 and is entitled "WIRELESS COMMUNICATION NETWORK COMMUNICATIONS THROUGH SESSION COMMUNICATION PROXIES." U.S. patent application Ser. No. 17/239,212 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (SGNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs are connected to the CUs which are larger computer centers that are closer to the network cores. The CUs are coupled to network functions and network elements in the network cores. The network cores execute the network functions and network elements to provide wireless data services to the wireless user devices over the RANs. Exemplary network functions and network elements include Access and Mobility Management Functions (AMFs), Unified Data Management (UDMs), Session Communication Proxies (SCPs), and Network Repository Functions (NRFs).

In a wireless network core, the network elements use the NRFs to register themselves and discover other network elements. For example, a UDM registers with an NRF, and an AMF accesses the NRF to discover the UDM. In some examples, the NRF returns an SCP in response to a discovery request. The SCP facilitates indirect communications between network element types. A network element may communicate with network elements of a given type by communicating through the SCP. Unfortunately, the NRF does not effectively select SCPs for network elements. Moreover, the NRFs do not efficiently enable the network elements to intelligently select SCPs.

TECHNICAL OVERVIEW

In some examples, Session Communication Proxies (SCPs) generate SCP status information. A source network function selects one of the SCPs based on the SCP status information. The source network function transfers data to the selected one of the SCPs. The selected one of the SCPs receives the data, selects a target network function, and transfers the data to the target network function.

In some examples, SCPs generate SCP location information. A source network function selects one of the SCPs based on the SCP location information. The source network function transfers data to the selected one of the SCPs. The selected one of the SCPs receives the data, selects a target network function, and transfers the data to the target network function.

In some examples, SCPs generate SCP status information and SCP location information. A source network function selects one of the SCPs based on the SCP status information and the SCP location information. The source network function transfers data to the selected one of the SCPs. The selected one of the SCPs receives the data, selects a target network function, and transfers the data to the target network function.

DESCRIPTION OF THE DRAWINGS

FIG. 8 illustrates an exemplary operation of the 5G communication network to exchange data communications over SCPs.

DETAILED DESCRIPTION

Figure 1:
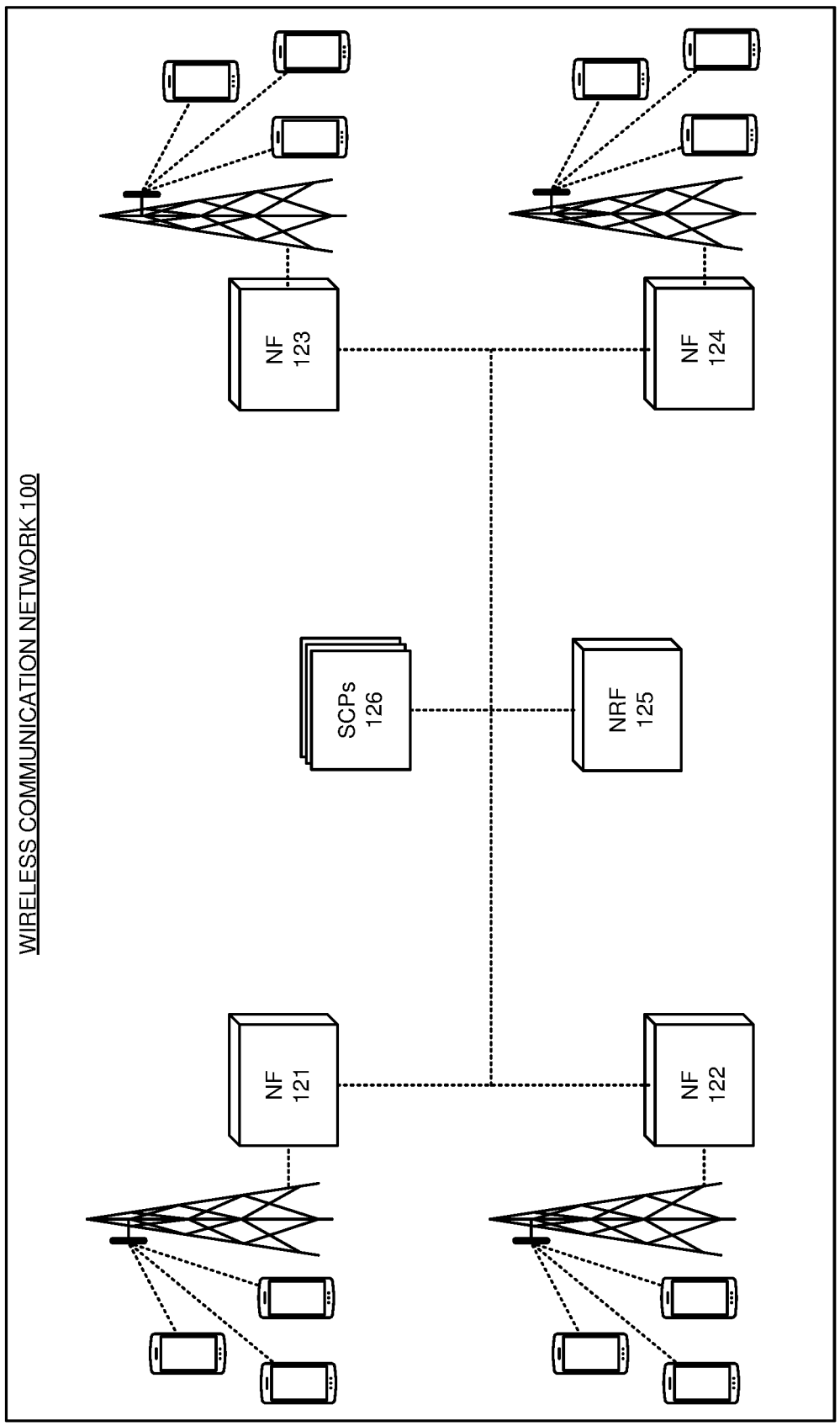
FIG. 1 illustrates a wireless communication network to exchange data communications over Session Communication Proxies (SCPs).

FIG. 1 illustrates wireless communication network 100 to exchange data communications through Session Communication Proxies (SCPs) 126. Wireless communication network 100 delivers services to wireless user devices like internet-access, machine communications, media-streaming, or some other wireless communications product. Wireless communication network 100 comprises Network Functions (NFs) 121-124, Network Repository Function (NRF) 125, and SCPs 126.

Various examples of network operation and configuration are described herein. In some examples, SCPs 126 determine their location information and status data. SCPs 126 transfer their location information and status to NRF 125. NRF 125 prioritizes SCPs 126 based on the location information and the status data. For example, NRF 125 may characterize individual ones of SCPs 126 by load and location. NF 121 transfers an NF request to NRF 125. NRF 125 receives the NF request from NF 125. In response, NRF 125 generates and transfers a list that prioritizes SCPs 126 based on the location information and the status data to NF 121. NF 121 responsively selects one of SCPs 126 based on the location information and the status data. For example, NF 121 may select one of SCPs 126 that is geographically proximate and lightly loaded. NF 121 transfers NF data to the selected one of SCPs 126. The selected one of SCPs 126 receives the NF data and forwards the NF data to NF 123. Advantageously, NRF 125 effectively selects SCPs 126 for NFs 121-124. Moreover, NRF 125 efficiently enables NFs 121-124 to intelligently select SCPs 126.

The wireless user devices and wireless access points illustrated in FIG. 1 communicate over links using wireless technologies like Fifth Generation New Radio (SGNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. The wireless access points and NFs 121-126 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), SGNR, LTE, WIFI, virtual switching, inter-processor communication, bus interfaces, and/or some other data communication protocols.

The wireless user devices comprise computers, phones, vehicles, sensors, robots, or other types of data appliance with wireless and/or wireline communication circuitry. The wireless access points are depicted as towers, but the wireless access points may use other mounting structures or no mounting structures at all. The wireless access points comprise Fifth Generation (5G) Radio Access Networks (RANs), LTE RANs, gNodeBs, eNodeBs, NB-IoT access nodes, LP-WAN base stations, wireless relays, WIFI hotspots, ENET access nodes, Bluetooth access nodes, and/or some other type of wireless or wireline network transceiver. The wireless user devices and the wireless access points comprise antennas, amplifiers, filters, modulation, analog/digital interfaces, microprocessors, software, memories, transceivers, bus circuitry, and the like. NFs 121-124 comprise network functions like Access and Mobility Management functions (AMFs), Session Management Functions (SMFs), User Plane Functions (UPFs), and the like. The wireless access points and NFs 121-126 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
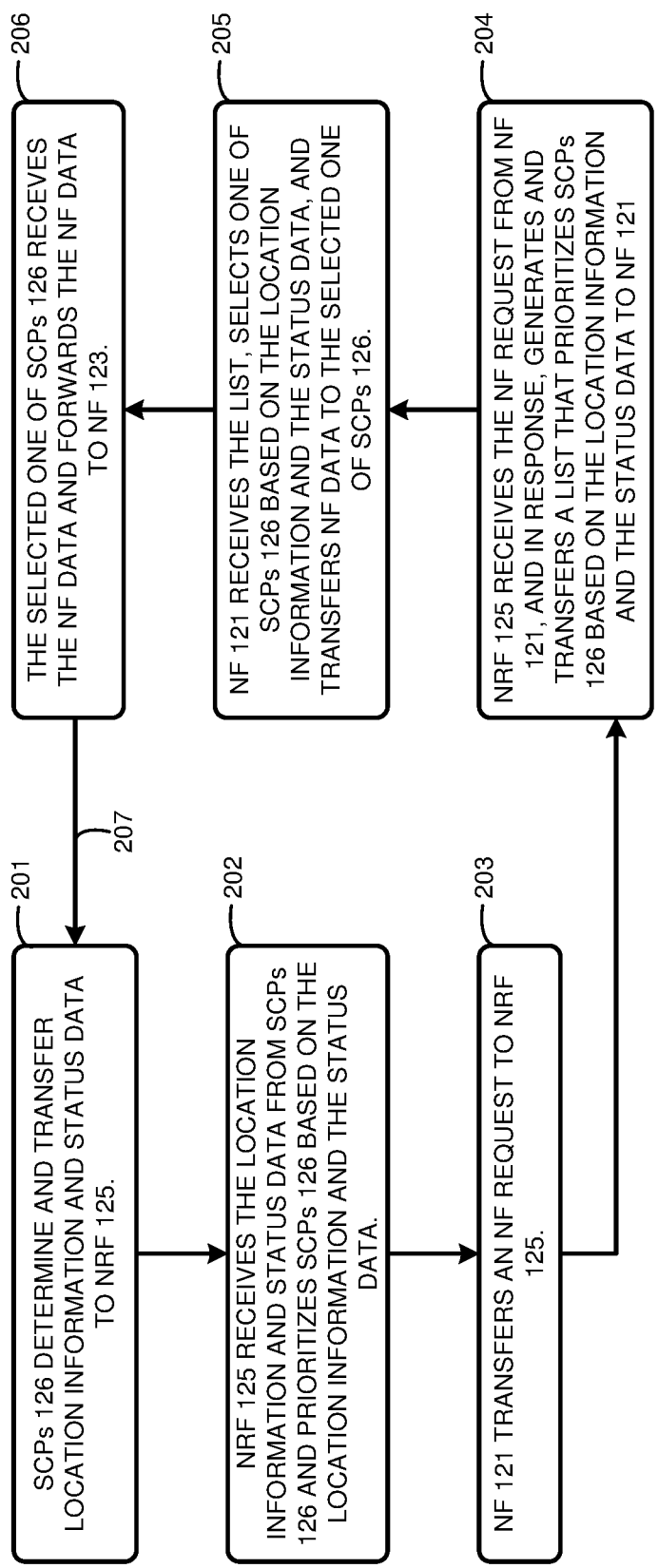
FIG. 2 illustrates an exemplary operation of the wireless communication network to exchange data communications over SCPs.

FIG. 2 illustrates an exemplary operation of wireless communication network 100 to exchange data communications through SCPs 126. The operation may vary in other examples. SCPs 126 determine and transfer location information and status data to NRF 125 (201). NRF 125 receives the location information and status data from SCPs 126 and prioritizes SCPs 126 based on the location information and the status data (202). NF 121 transfers an NF request to NRF 125 (203). For example, NF 121 may register with NRF 125 and the registration may indicate an NF type that NF 121 wants to establish communications with. NRF 125 receives the NF request from NF 121, and in response, generates and transfers a list that prioritizes SCP 126 based on the location information to NF 121 (204). NF 121 receives the list, selects one of SCPs 126 based on the location information and the status data, and transfers NF data to the selected one of SCPs 126 (205). The selected one of SCPs 126 receives the NF data and forwards the NF data to NF 123 (206). The process repeats (207).

Figure 3:
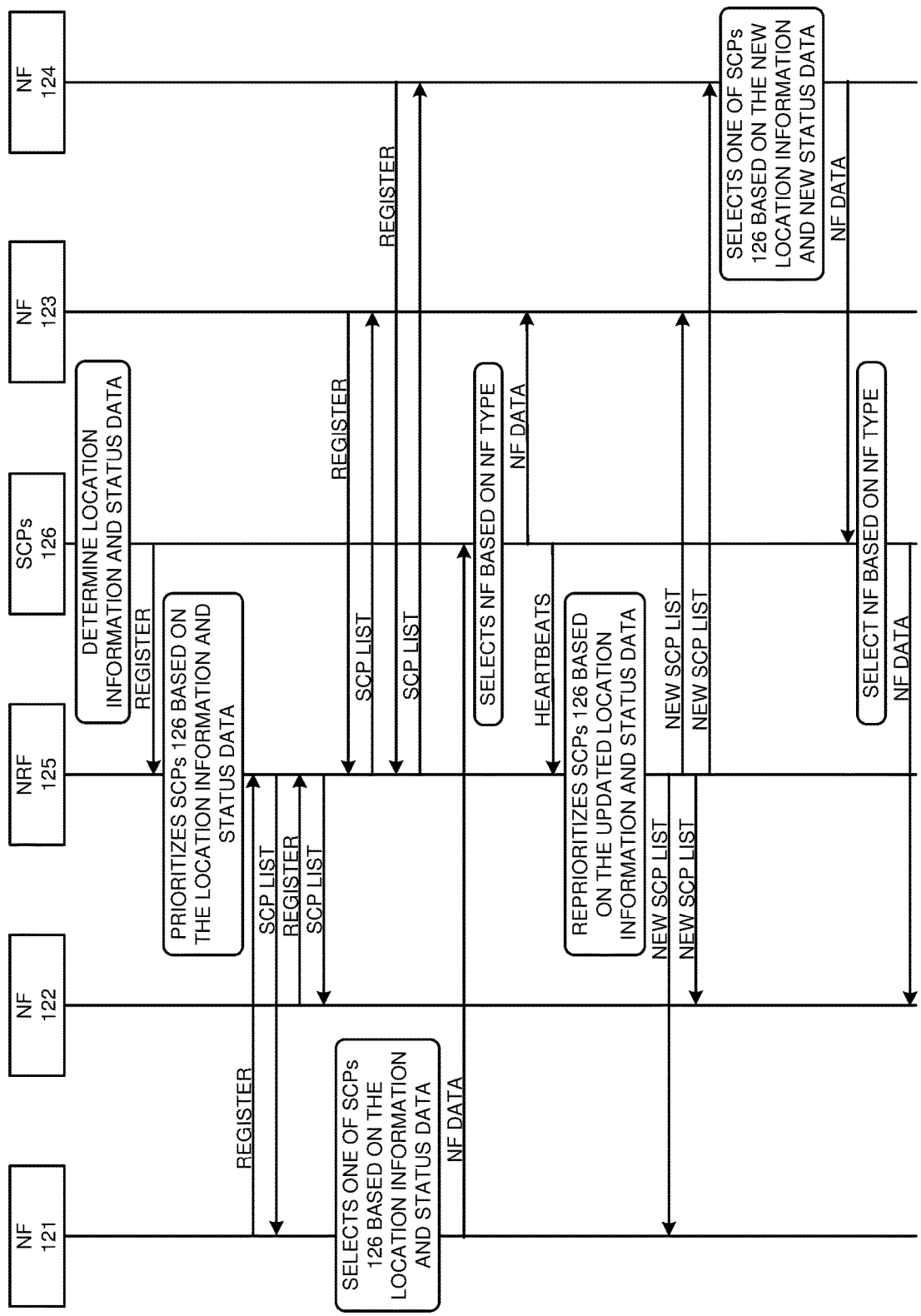
FIG. 3 illustrates another exemplary operation of the wireless communication network to exchange data communications over SCPs.

FIG. 3 illustrates an exemplary operation of wireless communication network 100 to exchange data communications through SCPs 126. The operation may vary in other examples. SCPs 126 determine location information and status data for themselves. For example, the location information may indicate geolocation and domain for the ones of SCPs 126 and the status data may indicate the load and capacity of the ones of SCPs 126. SCPs 126 register with NRF 125. During their registrations, SCPs 126 indicate their location information and status data to NRF 125. NRF 125 identifies the locations of SCPs 126 based on the location information and prioritizes SCPs 126 based on the status data.

NF 121 registers with NRF 125. The NF registration indicates the NF type for NF 121 and indicates the geolocation of NF 121. NRF 125 identifies the location of NF 121 and responsively generates an SCP list for NF 121. The SCP list prioritizes SCPs 126 based on their location and their status data. Typically, NRF 125 prioritizes SCPs that are proximate to NF 121 over SCPs that are distant from NF 121. Typically, NRF 125 prioritizes lightly loaded SCPs over heavily loaded SCPs. Typically, NRF 125 prioritizes SCPs that have higher capacity over SCPs that have less capacity. Typically, NRF 125 prioritizes SCPs that are proximate to the requesting NF over SCPs that are distant to the requesting NF. In some examples, NRF 125 normalizes the proximity, load, capacity, and/or other factors indicated by the location information and status data into a combined score to prioritize SCPs 126. NRF 125 transfers the SCP list to NF 121.

NF 122 registers with NRF 125. The NF registration indicates the NF type and geolocation of NF 122. NRF 125 identifies the location of NF 122 and responsively generates an SCP list for NF 122. The SCP list prioritizes SCPs 126 for NF 122 based on the SCP locations status data and the location of NF 122. NRF 125 transfers the SCP list to NF 122. NF 123 registers with NRF 125. The NF registration indicates the NF type and geolocation of NF 123. NRF 125 identifies the location of NF 123 and responsively generates an SCP list for NF 123. The SCP list prioritizes SCPs 126 for NF 123 based on the SCP locations status data and the location of NF 123. NRF 125 transfers the SCP list to NF 123. NF 124 registers with NRF 125. The NF registration indicates the NF type and geolocation of NF 124. NRF 125 identifies the location of NF 124 and responsively generates an SCP list for NF 124. The SCP list prioritizes SCPs 126 for NF 124 based on the SCP locations status data and the location of NF 124. NRF 125 transfers the SCP list to NF 124.

NF 121 identifies a need to communicate with another NF. For example, NF 121 may receive a service request from a wireless user device and responsively identify a NF need to fulfil the service request. In response, NF 121 selects one of SCPs 126 based on the location information and status data indicated by the SCP list. NF 121 transfers NF data to the selected one of SCPs 126. The NF data indicates an NF type. The selected one of SCPs 126 identifies the NF type in the NF data and in response, selects NF 123 for NF 121. The selected one of SCPs 126 transfers the NF data to NF 123 to establish communications between NF 121 and NF 123.

SCPs 126 transfer status heartbeats to NRF 125. The status heartbeats indicate updated status data and/or location information for the ones of SCPs 126. The frequency that SCPs 126 transfer the status heartbeats may be periodic, scheduled, semi-random, one-time, random, or some other rate. NRF 125 reprioritizes SCPs 126 based on the updated location information and status data. For example, the load of one of SCPs 126 may have fallen and NRF 125 may raise the priority of that SCP. NRF 125 transfers a new SCP list for NF 121 to NF 121, transfers a new SCP list for NF 122 to NF 122, transfers a new SCP list for NF 123 to NF 123, and transfers a new SCP list for NF 124 to NF 124.

NF 124 identifies a need to communicate with another NF. In response, NF 124 selects one of SCPs 126 based on the new location information and new status data indicated by the new SCP list. NF 124 transfers NF data to the selected one of SCPs 126. The NF data indicates an NF type. The selected one of SCPs 126 identifies the NF type in the NF data and in response, selects NF 122 for NF 124. The selected one of SCPs 126 transfers the NF data to NF 122 to establish communications between NF 124 and NF 122.

Figure 4:
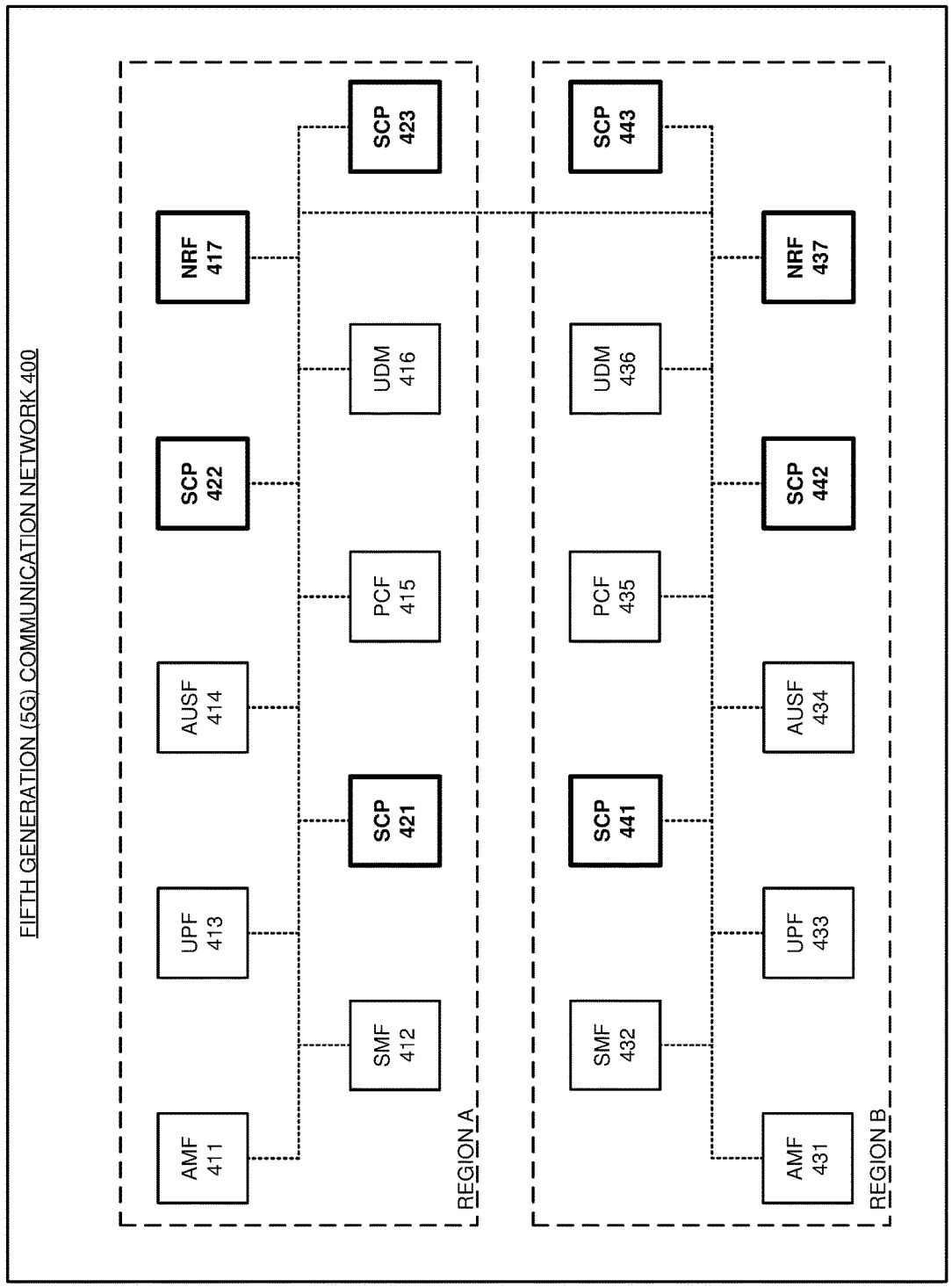
FIG. 4 illustrates a Fifth Generation (5G) communication network to exchange data communications over SCPs.

FIG. 4 illustrates Fifth Generation (5G) communication network 400 to exchange data communications through Session Communication Proxies (SCPs) 421-423 and SCPs 441-443. 5G communication network 400 comprises an example of wireless communication network 100, although network 100 may differ. 5G network 400 comprises Region A and Region B. Region A and Region B are typically different geographic areas, however the regions may comprise different network domains, Public Land Mobile Networks (PLMNs), Virtual Private Networks (VPNs), and the like. In Region A, 5G network 400 comprises Access and Mobility Management Function (AMF) 411, Session Management Function (SMF) 412, User Plane Function (UPF) 413, Authentication Server Function (AUSF) 414, Policy Control Function (PCF) 415, Unified Data Management (UDM) 416, Network Repository Function (NRF) 417, and SCPs 421-423. In Region B, 5G network 400 comprises AMF 431, SMF 432, UPF 433, AUSF 434, PCF 435, UDM 436, NRF 437, and SCPs 441-443. Other network functions, network elements, and regions are typically present in network 400 but are omitted for clarity.

In Region A, SCPs 421-423 register with NRF 417 and transfer registration information to NRF 417. The registration information comprises SCP addresses, SCP domains, SCP geolocations, SCP loads, SCP capacities, and the like for individual ones of SCPs 421-423. NRF 417 receives the registrations and responsively maintains SCP profiles for SCPs 421-423. The SCP profiles indicate an SCP Identifier (ID), SCP address, SCP geolocation, SCP domain, SCP load information, SCP capacity information, SCP capabilities and features, accessible end points, and/or other status data for individual ones of SCPs 421-423. NRF 417 determines the number of available SCPs in Region A. For example, NRF 417 may determine there are six active SCP instances in Region A. NRF 417 transfers SCP update messages to NRF 437. The SCP update messages indicate the SCP profiles for SCPs 421-423. NRF 437 maintains SCP profiles for SCPs 421-423. NRF 437 determines the number of active SCP sessions in Region A.

In Region B, SCPs 441-443 register with NRF 437 and transfer registration information to NRF 437. The registration information comprises SCP addresses, SCP domains, SCP geolocations, SCP loads, SCP capacities, and the like for individual ones of SCPs 441-443. NRF 437 receives the registrations and responsively maintains SCP profiles for SCPs 441-443. The SCP profiles indicate an SCP Identifier (ID), SCP address, SCP geolocation, SCP load information, SCP capacity information, SCP capabilities and features, accessible end points, and/or other status data for individual ones of SCPs 441-443. NRF 437 determines the number of available SCPs in Region B. NRF 437 transfers SCP update messages to NRF 417. The SCP update messages indicate the SCP profiles for SCPs 441-443. NRF 417 maintains SCP profiles for SCPs 441-443. NRF 417 determines the number of active SCP sessions in Region B.

In Region A, NFs 411-416 register with NRF 417 and transfer registration information to NRF 417. The registration information comprises NF ID, NF type, NF address, NF geolocation, NF load, NF capacity, and the like for individual ones of NFs 411-416. NRF 417 receives the registrations and responsively maintains NF profiles for NFs 411-416. The NF profiles indicate the NF ID, NF type, NF address, NF geolocation, NF load, NF capacity, and/or other status information for individual ones of NFs 411-416. NRF 417 maintains NF group data that indicates the number of active sessions for each NF type. For example, the NF group data may indicate there are three active AUSF sessions in Region A. NRF 417 transfers registration update messages to NRF 437. The registration update messages indicate the NF profiles and NF group data for NFs 411-416. NRF 437 maintains NF profiles and NF group data for NFs 411-416.

NRF 417 prioritizes SCPs 421-423 and SCPs 441-443 for individual ones of NFs 411-416 based SCP ID, SCP address, SCP geolocation, SCP load information, SCP capacity information, SCP capabilities and features, accessible end points, and/or other status data of SCPs 421-423 and SCPs 441-443, and the geographic location of NFs 411-416. The SCP load may comprise microprocessor load and the SCP capacity may comprise memory occupancy. Typically, NRF 417 prioritizes SCPs that are geographically close to ones of NFs 411-416 over SCPs that are geographically further from NFs 411-416. Typically, NRF 417 prioritizes SCPs that have lower load over SCPs that have higher load. Typically, NRF 417 prioritizes SCPs that have more capacity over SCPs that have less capacity. In some examples, NRF 417 normalizes, weights, and combines the load, capacity, geolocation, and/or other factors for individual ones of SCPs into a priority score. NRF 417 generates prioritized lists of SCPs 421-423 and 441-443 for NFs 411-416 based on the priority scores. The prioritized lists rank SCPs 421-423 and 441-443 for NFs 411-416 and indicate the load, capacity, geolocation, and/or other status data for SCPs 421-423 and 441-443. The prioritized lists may vary between NFs 411-416. For example, the prioritized SCP list for AMF 411 may rank SCP 421 over SCP 422 while the prioritized list for AUSF 414 may rank SCP 422 over SCP 421. NRF 417 transfers the prioritized SCP lists to NFs 411-416.

In Region B, NFs 431-436 register with NRF 437. NFs 431-436 transfer registration information to NRF 437. The registration information comprises NF ID, NF type, NF address, NF geolocation, NF load, NF capacity, and the like for individual ones of NFs 431-436. NRF 437 receives the registrations and responsively maintains NF profiles for NFs 431-436. The NF profiles indicate individual status for NFs 431-436 and indicate the NF ID, NF type, NF address, NF geolocation, NF load, NF capacity, and the like for individual ones of NFs 431-436. NRF 437 maintains NF group data that indicates the number of active sessions for each NF type. NRF 437 transfers registration update messages to NRF 417. The registration update messages indicate the NF profiles and NF group data for NFs 431-436. NRF 417 receives the registration update messages and responsively maintains NF profiles and NF group data for NFs 431-436.

NRF 437 prioritizes SCPs 421-423 and SCPs 441-443 for individual ones of NFs 431-436 based on the load, capacity, geographic location of SCPs 421-423 and SCPs 441-443, and the geographic location of NFs 431-436. The SCP load may comprise microprocessor load and the SCP capacity may comprise memory occupancy. Typically, NRF 437 prioritizes SCPs that are geographically close to ones of NFs 431-436 over SCPs that are geographically further from NFs 431-436. Typically, NRF 437 prioritizes SCPs that have lower load over SCPs that have higher load. Typically, NRF 437 prioritizes SCPs that have more capacity over SCPs that have less capacity. In some examples, NRF 437 normalizes the load, capacity, geolocation, and/or other factors for individual ones of SCPs 421-423 and 441-443 into a score to prioritize SCPs 421-423 and 441-443 for NFs 411-416. NRF 417 generates prioritized lists of SCPs 421-423 and 441-443 for NFs 411-416 based on the prioritizations. The prioritized lists rank SCPs 421-423 and 441-443 for NFs 411-416 and indicate the load, capacity, geolocation, and/or other status data for SCPs 421-423 and 441-443. The prioritized lists may vary between NFs 431-436. For example, the prioritized SCP list for SMF 432 may rank SCP 421 over SCP 442 while the prioritized list for PCF 435 may rank SCP 442 over SCP 421. NRF 417 transfers the prioritized SCP lists to NFs 411-416.

In Region A, NFs 411-416 identify a NF function need. For example, AMF 411 may determine that is does not currently have access to an SMF that can serve a PDU a wireless user device. NFs 411-416 select ones of SCPs 421-423 and 441-443 based on their SCP lists. For example, UDM 416 may select SCP 422 for communication based on the rank, proximity, load, and capacity of SCP 422 indicated by the SCP list for UDM 416. NFs 411-416 transfer NF discovery requests for NF types to their selected SCPs. For example, the NF discovery request may specify PCF as the NF type. SCPs 421-423 and 441-443 identify the requested NF types in the NF discovery requests. SCPs 421-423 forward the NF discovery requests to the requested NF types. For example, AMF 411 may transfer an NF discovery request for an AUSF to SCP 421, and SCP 421 may identify the NF type as AUSF and responsively route the NF discovery request to AUSF 414 or AUSF 434. NFs 411-416 establish communications with the requested NF types over SCPs 421-423 and 441-443. In Region B, NFs 431-436 may establish communications with other NFs over SCPs 421-423 and 441-443 in a similar manner to NFs 411-416 in region A.

In Region A, SCPs 421-423 transfer status heartbeats to NRF 417. The status heartbeats indicate updated SCP load, SCP capacity, and/or other updated SCP information for individual ones of SCPs 421-423. The transfer of the heartbeats may be periodic, scheduled, semi-random, one-time, random, or some other rate. NRF 417 receives the status heartbeats and responsively updates the SCP profiles to indicate the updated SCP load, SCP capacity, and/or other updated information for individual ones of SCPs 421-423. NRF 417 updates the SCP group data in response to the status updates. For example, one of SCPs 421-423 may deactivate during a maintenance period and NFR 417 may update the SCP group data to reflect this change. NRF 417 transfers status heartbeat messages for SCPs 421-423 to NRF 437. The status heartbeat messages indicate the updated SCP profiles and updated SCP group data for SCPs 421-423. In response, NRF 437 updates the SCP profiles and SCP group data for SCPs 421-423.

In Region B, SCPs 441-443 transfer status heartbeats to NRF 437. The status heartbeats indicate updated SCP load, SCP capacity, and/or other updated SCP information for individual ones of SCPs 441-443. The transfer of the heartbeats may be periodic, scheduled, semi-random, one-time, random, or some other rate. NRF 437 receives the status updates and responsively updates the SCP profiles to indicate the updated SCP load, SCP capacity, and/or other updated information for individual ones of SCPs 441-443. NRF 437 updates the SCP group data in response to the status updates. For example, one of SCPs 441-443 may reactivate after the end of a maintenance period and NFR 437 may update the SCP group data to reflect this change. NRF 437 transfers status heartbeat messages for SCPs 441-443 to NRF 417. The status heartbeat messages indicate the updated SCP profiles and updated SCP group data for SCPs 441-443. In response, NRF 417 updates the SCP profiles and SCP group data for SCPs 441-443.

In Region A, NRF 417 reprioritizes SCPs 421-423 and SCPs 441-443 for individual ones of NFs 411-416 based on the updated load, updated capacity, updated location information, and/or other updated status data indicated by the status heartbeats of SCPs 421-423 and SCPs 441-443, and the geographic location of NFs 411-416. NRF 417 generates new prioritized lists of SCPs 421-423 and 441-443 for NFs 411-416 based on the updated prioritizations. The new prioritized lists rank SCPs 421-423 and 441-443 for NFs 411-416 and indicate the updated load, updated capacity, updated geolocation, and/or other updated status data for SCPs 421-423 and 441-443. NRF 417 transfers the prioritized SCP lists to NFs 411-416.

In Region B, NRF 437 reprioritizes SCPs 421-423 and SCPs 441-443 for individual ones of NFs 431-436 based on the updated load, updated capacity, and updated location information of SCPs 421-423 and SCPs 441-443, and the geographic location of NFs 431-436. NRF 437 generates new prioritized lists of SCPs 421-423 and 441-443 for NFs 431-436 based on the updated prioritizations. The new prioritized lists rank SCPs 421-423 and 441-443 for NFs 431-436 and indicate the updated load, updated capacity, updated geolocation, and/or other updated status data for SCPs 421-423 and 441-443. NRF 437 transfers the prioritized SCP lists to NFs 431-436.

In Region A, NFs 411-416 identify another NF function need. For example, AMF 411 may determine that is does not currently have access to an AUSF to authenticate a wireless user device. NFs 411-416 select ones of SCPs 421-423 and 441-443 based on their updated SCP lists. For example, SMF 412 may have previously selected SCP 421 and subsequently selects SCP 422 for communication based on the updated rank, updated proximity, updated load, and updated capacity of SCP 422 as indicated by the SCP list for SMF 412. NFs 411-416 transfer NF discovery requests for NF types to their selected SCPs. SCPs 421-423 and 441-443 identify the requested NF types in the NF discovery requests and forward the NF discovery requests to the requested NF types. NFs 411-416 establish communications with the requested NF types over SCPs 421-423 and 441-443. In Region B, NFs 431-436 may establish communications with other NFs over SCPs 421-423 and 441-443 in a similar manner to NFs 411-416 in region A.

In some examples, NRFs 417 and 437 hide individual ones of SCPs 421-423 and 441-443 from discovery by NFs 411-416 and NFs 431-436. NRF 417 retrieves SCP profiles and SCP group data for SCPs 421-423 and 441-443 and determines the SCP geolocation, SCP load, SCP capacity, and the number of active SCP instances. NRF 417 determines an SCP performance threshold. NRF 417 determines when individual ones of SCPs 421-423 and 441-443 fall below the performance threshold. For example, NRF 417 may determine the load for one of SCP 443 is below the performance threshold and NRF 417 may responsively remove SCP 443 from the prioritized SCP lists for NFs 421-423 and 441-443. NRF 417 does not indicate hidden ones of SCPs 421-423 and 441-443 to NFs 411-416 to prevent the NFs 411-416 from establishing communications over the hidden SCP. In Region B, NRF 437 may hide SCPs 421-423 and 441-443 in a similar manner as NRF 417.

In some examples, NRFs 417 and 437 load balance the prioritization of SCPs 421-423 and 441-443. NRF 417 receives registration requests from NFs 411-416. NRF 417 retrieves SCP profiles and SCP group data for SCPs 421-423 and 441-443. NRF 417 load-balances the priority of SCPs 421-423 and 441-443. For example, NRF 417 may generate and transfer SCP lists to NFs 411-416 that give the highest priority to SCPs 421-423 and 441-443 in a proportional manner so that SCPs 421-423 and 441-443 are selected by NFs 411-416 in an equal manner. Typically, NRF 417 prioritizes SCPs 421-423 and 441-443 to distribute SCP usage across the 5G core 410 and to prevent any one SCP from becoming overused. In Region B, NRF 437 may load balance the priority of SCPs 421-423 and 441-443 in a similar manner as NRF 417.

Figure 5:
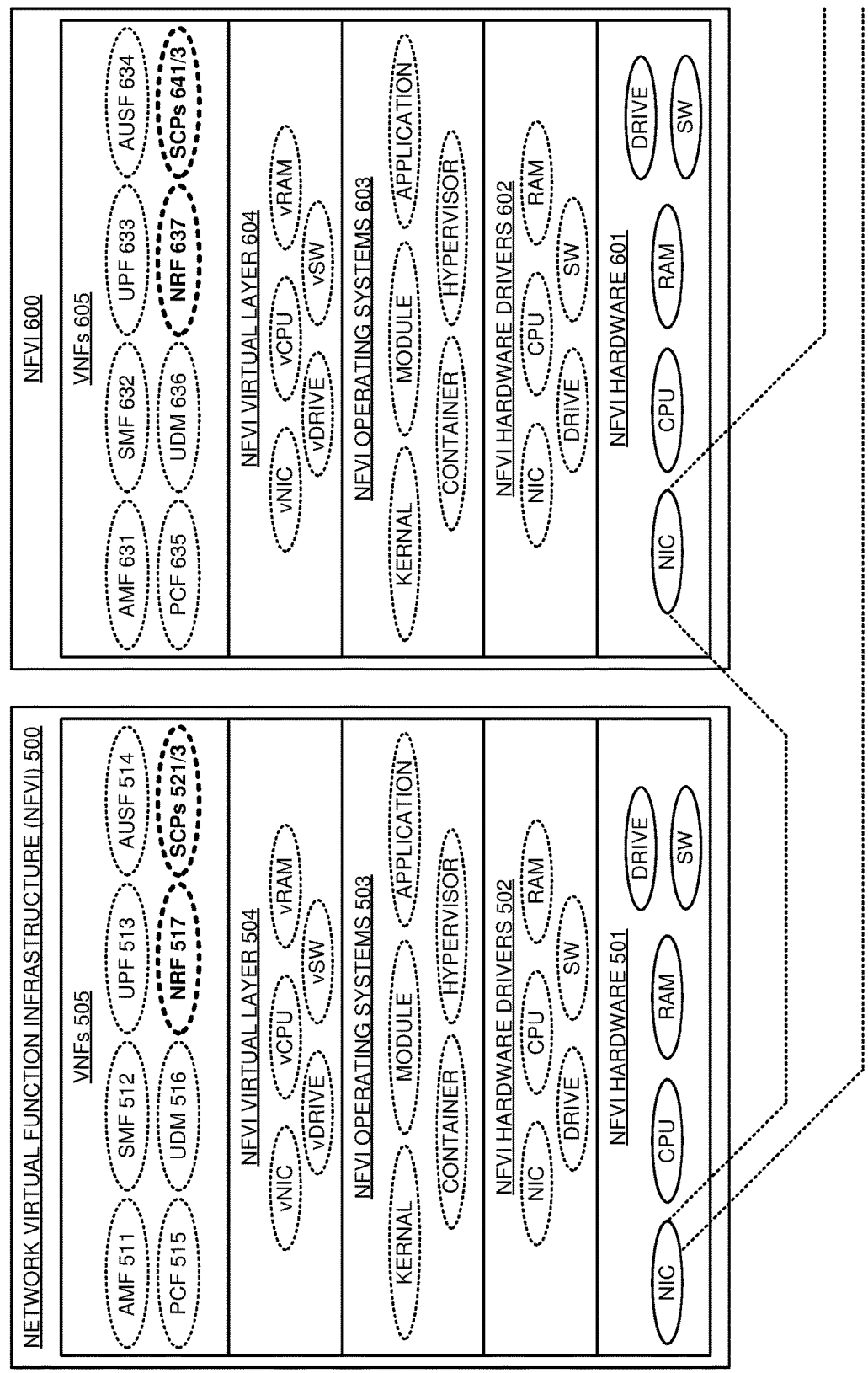
FIG. 5 illustrates Network Function Virtualization Infrastructures (NFVIs) in the 5G communication network.

FIG. 5 illustrates Network Function Virtualization Infrastructure (NFVI) 500 and NFVI 600. NFVI 500 and NFVI 600 comprise an example of network functions 121-126, although functions 121-126 may vary from this example. NFVI 500 comprises NFVI hardware 501, NFVI hardware drivers 502, NFVI operating systems 503, NFVI virtual layer 504, and NFVI Virtual Network Functions (VNFs) 505. NFVI hardware 501 comprises Network Interface Cards (NICs), CPU, RAM, Flash/Disk Drives (DRIVE), and Data Switches (SW). NFVI hardware drivers 502 comprise software that is resident in the NIC, CPU, RAM, DRIVE, and SW. NFVI operating systems 503 comprise kernels, modules, applications, containers, hypervisors, and the like. NFVI virtual layer 504 comprises vNIC, vCPU, vRAM, vDRIVE, and vSW. NFVI VNFs 505 comprise AMF 511, SMF 512, UPF 513, AUSF 514, PCF 515, UDM 516, NRF 517, and SCPs 521-523. Additional VNFs and network elements like Network Slice Selection Function (NSSF), Unified Data Registry (UDR), and Network Exposure Function (NEF) are typically present but are omitted for clarity. NFVI 500 may be located at a single site or be distributed across multiple geographic locations. The NIC in NFVI hardware 501 is coupled to a NIC in NFVI hardware 601 and to external systems. NFVI hardware 501 executes NFVI hardware drivers 502, NFVI operating systems 503, NFVI virtual layer 504, and NFVI VNFs 505 to form AMF 411, SMF 412, UPF 413, AUSF 414, PCF 415, UDM 416, NRF 417, and SCPs 421-423.

In a like manner, NFVI 600 comprises NFVI hardware 601, NFVI hardware drivers 602, NFVI operating systems 603, NFVI virtual layer 604, and NFVI VNFs 605. NFVI hardware 601 comprises NICs, CPU, RAM, DRIVE, and SW. NFVI hardware drivers 602 comprise software that is resident in the NIC, CPU, RAM, DRIVE, and SW. NFVI operating systems 603 comprise kernels, modules, applications, containers, hypervisors, and the like. NFVI virtual layer 604 comprises vNIC, vCPU, vRAM, vDRIVE, and vSW. NFVI VNFs 605 comprise AMF 631, SMF 632, UPF 633, AUSF 634, PCF 635, UDM 636, NRF 637, and SCPs 641-643. Additional VNFs and network elements are typically present but are omitted for clarity. NFVI 600 may be located at a single site or be distributed across multiple geographic locations. The NIC in NFVI hardware 600 is coupled to a NIC in NFVI hardware 501 and to external systems. NFVI hardware 601 executes NFVI hardware drivers 602, NFVI operating systems 603, NFVI virtual layer 604, and NFVI VNFs 605 to form AMF 431, SMF 432, UPF 433, AUSF 434, PCF 435, UDM 436, NRF 437, and SCPs 441-443. In some examples, NFVI 500 and NFVI 600 are integrated into a signal NFVI that executes to from the network functions and network elements in Region A and Region B of 5G core 410.

Figure 6:
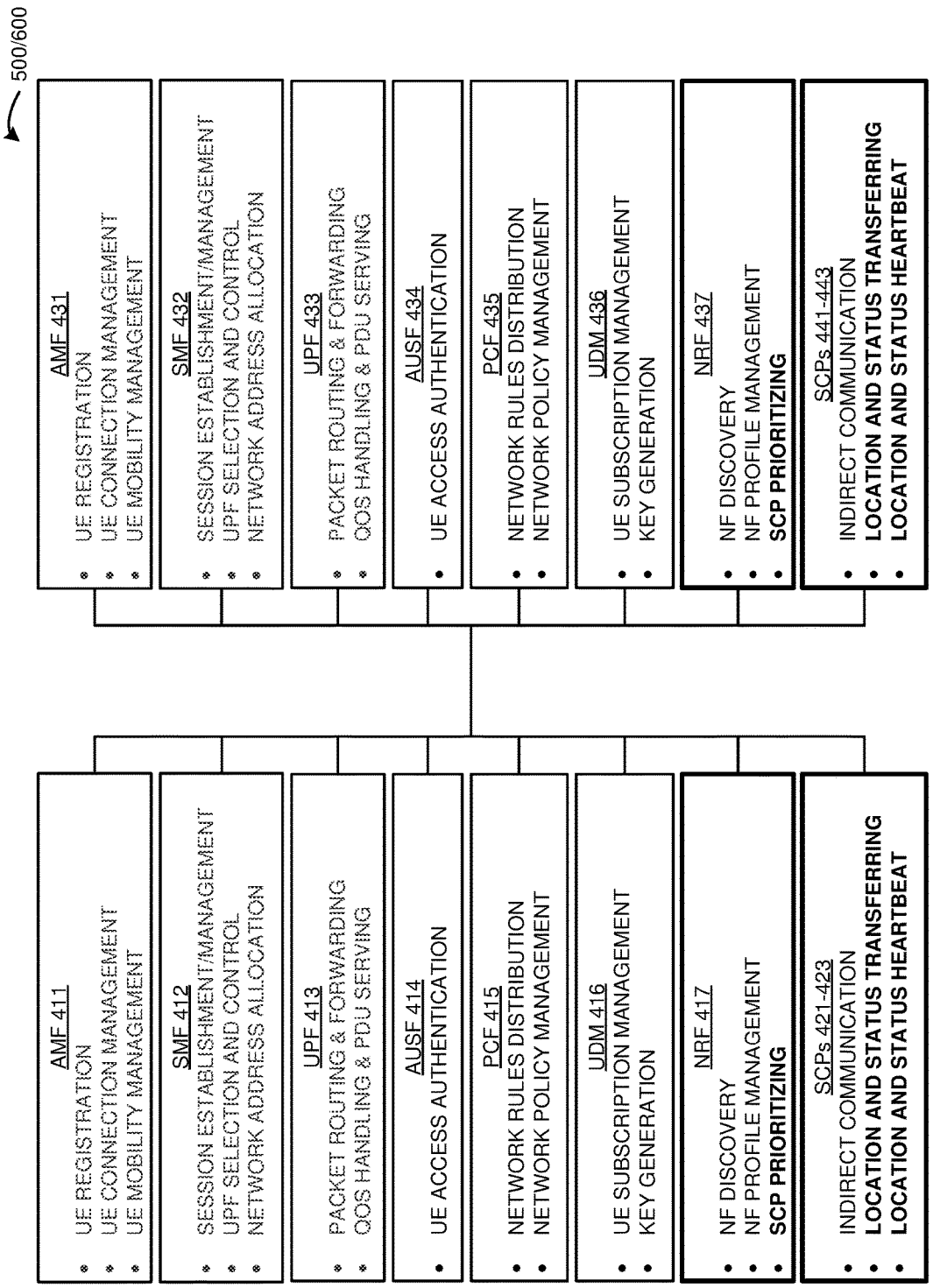
FIG. 6 further illustrates the NFVIs in the 5G communication network.

FIG. 6 further illustrates NFVI 500 and NFVI 600 in 5G communication network 400. AMPs 411 and 431 perform UE registration and connection, UE connection/mobility management, and UE authentication and authorization. SMFs 412 and 432 perform session establishment and management, UPF selection and control, network address allocation, and N1 termination. UPFs 413 and 433 perform packet routing & forwarding, packet inspection, QoS handling, PDU interconnection, and mobility anchoring. AUSFs 424 and 434 perform UE access authentication. PCFs 425 and 435 perform network rules management and distribution and network subscription policy management. UDMs 416 and 436 perform LIE subscription management and key generation. NRFs 417 and 437 perform network function discovery, network function profile management, SCP prioritization. SCPs 421-423 and 441-443 perform indirect communication, location and status transferring, and location and status heartbeat transferring.

In this example, AMF 411 establishes communications with other NFs through SCPs 421-423 and 441-443, however the operation may vary in other examples. SCPs 421-423 register with NRF 417 and indicate their SCP addresses, SCP domains, SCP geolocations, SCP loads, SCP capacities, and the like for individual ones of SCPs 421-423. The SCP loads may comprise microprocessor occupancy, Input/Output percent, and/or memory occupancy. NRF 417 receives the registrations and responsively maintains SCP profiles for SCPs 421-423. The SCP profiles indicate an SCP IDs, SCP addresses, SCP geolocations, SCP domains, SCP load information, SCP capacity information, accessible end points, and/or other status data for individual ones of SCPs 421-423. NRF 417 identifies the amount of available SCPs in Region A. NRF 417 transfers SCP update messages to NRF 437. The SCP update messages indicate the SCP profiles for SCPs 421-423. NRF 437 maintains SCP profiles for SCPs 421-423 and identifies the amount of active SCP sessions in Region A.

SCPs 441-443 register with NRF 437 and indicate their SCP addresses, SCP domains, SCP geolocations, SCP loads, SCP capacities, and the like for individual ones of SCPs 441-443. NRF 437 receives the registrations and responsively maintains SCP profiles for SCPs 441-443 that indicate SCP IDs, SCP addresses, SCP geolocations, SCP load information, SCP capacity information, accessible end points, and/or other status data for individual ones of SCPs 441-443. NRF 437 identifies the amount of available SCPs in Region B. NRF 437 transfers SCP update messages to NRF 417 that indicate the SCP profiles for SCPs 441-443. NRF 417 maintains SCP profiles for SCPs 441-443. NRF 417 determines the number of active SCP sessions in Region B.

AMF 411 registers with NRF 417. AMF 411 indicates its NF ID, NF type, NF address, NF geolocation, NF load, NF capacity, and the like to NRF 417. NRF 417 receives the registration and responsively creates an NF profile for AMF 411. The NF profiles indicate the NF ID, NF type, NF address, NF geolocation, NF load, NF capacity, and/or other status information for AMF 411. NRF 417 transfers a registration update message to NRF 437 that indicates the NF profile for AMF 411 and NF group data for NFs 411-416. NRF 437 maintains NF profiles and NF group data for NFs 411-416.

NRF 417 prioritizes SCPs 421-423 and SCPs 441-443 for AMF 411 based on the load, capacity, geographic location of SCPs 421-423 and SCPs 441-443, and the geographic location of AMF 411. NRF 417 prioritizes SCPs that are geographically close to ones AMF 411 over SCPs that are geographically distant from AMF 411. NRF 417 prioritizes SCPs that have lower load over SCPs that have higher load. NRF 417 prioritizes SCPs that have more capacity over SCPs that have less capacity. NRF 417 normalizes the load, capacity, geolocation, and/or other factors for individual ones of SCPs 421-423 and 441-443 into scores to prioritize SCPs 421-423 and 441-443 for AMF 411. NRF 417 generates prioritized lists of SCPs 421-423 and 441-443 for AMF 411 that ranks SCPs 421-423 and 441-443 for AMF 411 and that indicates the load, capacity, geolocation, and/or other status data for SCPs 421-423 and 441-443. NRF 417 transfers the prioritized SCP list to AMF 411. In some examples, NRF 417 may load balances the priority of SCPs 421-423 and 441-443 to distribute NF usage of the SCPs. NRF 437 may prioritize SCPs 421-423 and 441-443 in a similar manner to NRF 417.

AMF 411 identifies an NF function need for a UDM. For example, AMF 411 may determine that it needs access to a UDM to retrieve context for a wireless user device. AMF 411 selects ones of SCP 421 based on the priority, geolocation, load, and capacity for SCP 421 indicated by the SCP list. AMF 411 transfers an NF discovery request for a UDM to SCP 421. SCPs 421 identifies the requested NF types as UDM and responsively selects UDM 416 to establish communication. In other examples, SCP 421 may instead select UDM 437 when SCP 421 can access UDM 437. SCP forwards the NF discovery requests to UDM 416. UDM 416 accepts the NF discovery request and transfers an indication to AMF 411. AMF 411 communications with UDM 416. In NFs 412-416 and 431-436 may establish communications with other NFs over SCPs 421-423 and 441-443 in a similar manner to AMF 411.

SCPs 421-423 transfer status heartbeats to NRF 417 that indicate updated SCP load, SCP capacity, and/or other updated SCP information for individual ones of SCPs 421-423. For example, the load of SCP 421 may have increased, and SCP 421 may indicate this to NRF 417 in the status heartbeat. NRF 417 receives the status updates and responsively updates the SCP profiles to indicate the updated SCP load, SCP capacity, and/or other updated information for individual ones of SCPs 421-423. NRF 417 updates the SCP group data in response to the status updates NRF 417 transfers status heartbeat messages for SCPs 421-423 to NRF 437 that indicate the updated SCP profiles and updated SCP group data for SCPs 421-423. In response, NRF 437 updates the SCP profiles and SCP group data for SCPs 421-423.

SCPs 441-443 transfer status heartbeats to NRF 437 that indicate updated SCP load, SCP capacity, and/or other updated SCP information for individual ones of SCPs 441-443. NRF 437 receives the status updates and responsively updates the SCP profiles to indicate the updated SCP load, SCP capacity, and/or other updated information for individual ones of SCPs 441-443. NRF 437 updates the SCP group data in response to the status updates. NRF 437 transfers status heartbeat messages for SCPs 441-443 to NRF 417. The status heartbeat messages indicate the updated SCP profiles and updated SCP group data for SCPs 441-443. In response, NRF 417 updates the SCP profiles and SCP group data for SCPs 441-443.

NRF 417 reprioritizes SCPs 421-423 and SCPs 441-443 for AMF 411 based on the updated load, updated capacity, updated location information, and the geographic location of AMF 411. NRF 417 generates new prioritized lists of SCPs 421-423 and 441-443 for AMF 411 based on the updated prioritizations. The new prioritized lists rank SCPs 421-423 and 441-443 for NFs 411-416 and indicate the updated load, updated capacity, updated geolocation, and/or other updated status data for SCPs 421-423 and 441-443. NRF 417 transfers the new prioritized SCP list to AMF 411.

AMF 411 identifies a need for an AUSF. For example, AMF 411 may determine that is does not currently have access to an AUSF to authenticate a wireless user device. AMF 411 selects ones of SCP 442 based on updated load, updated capacity, and/or other updated information for SCP 442 indicated by the new SCP list. AMF 411 transfers an NF discovery request for AUSF to SCP 442. SCP 442 identifies the requested NF type in the NF discovery request as AUSF and responsively selects AUSF 434 for AMF 411. SCP 442 forwards the NF discovery request to AUSF 434. AUSF 434 accepts the NF discovery request and responsively transfers an indication to AMF 411. AMF 411 establish communications with the requested with AUSF 434.

Figure 7:
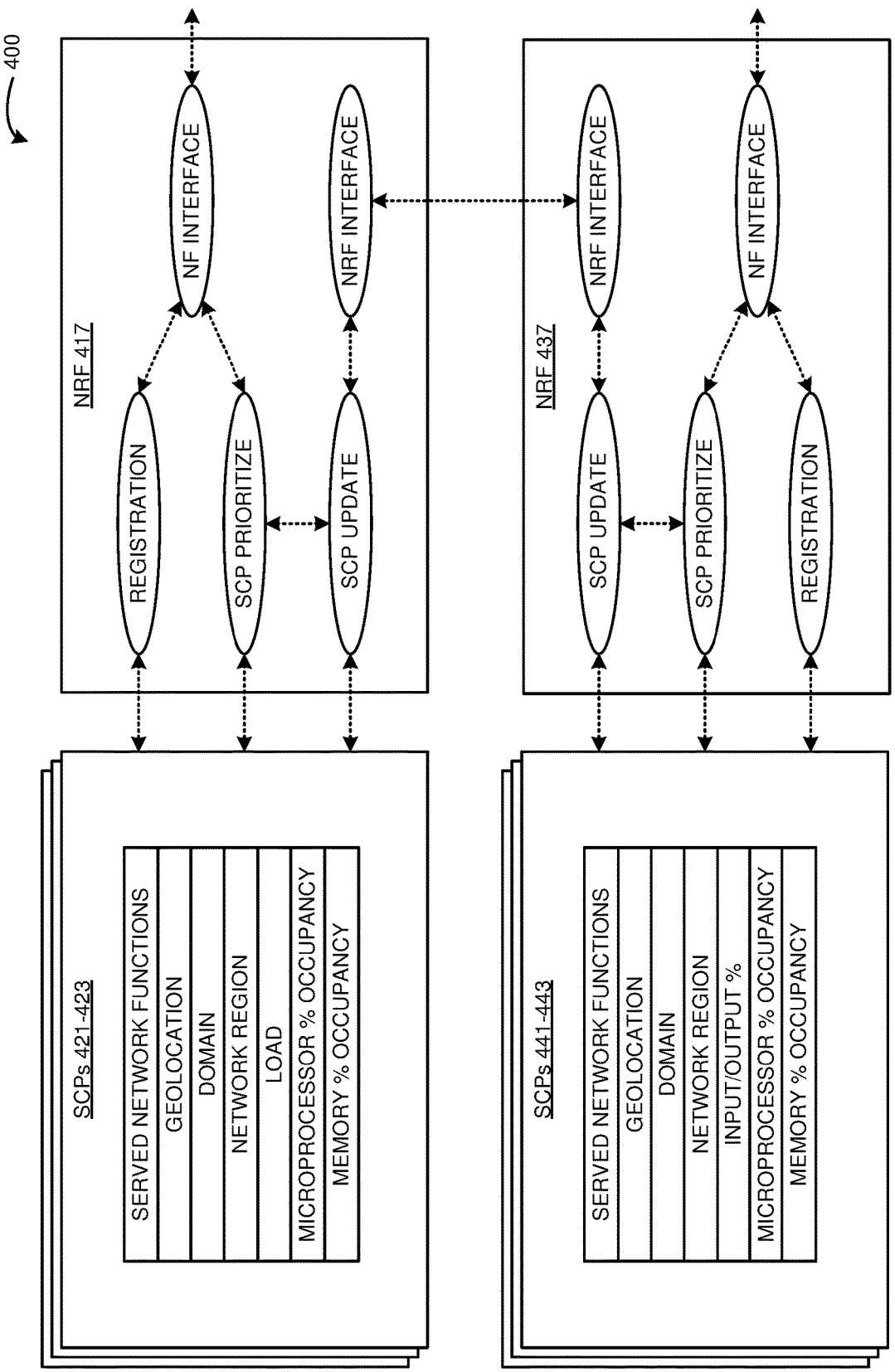
FIG. 7 illustrates NRFs and SCPs in the 5G communication network.

FIG. 7 illustrates NRFs 417 and 437 and SCPs 421-423 and 441-443 in 5G communication network 400. NRFs 417 and 437 comprise examples of NRF 125, although NRF 125 may differ. SCPs 421-423 and 441-443 transfer their addresses, loads, and locations to NRFs 417 and 437 during SCP registration. Once registered, SCPs 421-423 and 441-443 transfer status heartbeats that indicate updated addresses, updated loads, and updated locations to NRFs 417 and 437. NRFs 417 and 437 comprise registration components that interact with SCPs 421-423 and 441-443 to obtain SCP status data and SCP location information and that interact with NFs 411-416 and 431-436 to obtain NF locations and NF addresses. NRFs 417 and 437 comprise select/prioritize components that select SCP addresses and prioritize the selected SCP addresses based on SCP load, SCP location, and NF location. Lightly loaded SCPs are typically given a higher priority than heavily loaded SCPs. Geographically closer SCPs are typically given a higher priority than geographically further SCPs. Load, location, and SCP other factors may be normalized and combined into a common SCP priority score.

FIG. 8 illustrates an exemplary operation of the 5G communication network to exchange data communications through SCPs 421-423 and 441-443. The operation may vary in other examples. In this example, AMF 411 discovers a UDM and PCF through SCP 421 to serve User Equipment (UE) 801 and SMF 412 discovers a UDM through SCP 422 to serve UE 801, however the operation may differ in other examples.

In Region A, SCPs 421-423 register with NRF 417. NRF 417 receives the registrations and responsively maintains SCP profiles for SCPs 421-423 that indicate SCP ID, SCP address, SCP geolocation, SCP domain, SCP load information, SCP capacity information, accessible end points, and/or other status data for individual ones of SCPs 421-423. NRF 417 transfers SCP update messages to NRF 437. NRF 437 receives the update messages and responsively maintains SCP profiles for SCPs 421-423. In Region B, SCPs 441-443 register with NRF 437. NRF 437 receives the registrations and responsively maintains SCP profiles for SCPs 441-443 that indicate SCP ID, SCP address, SCP geolocation, SCP domain, SCP load information, SCP capacity information, accessible end points, and/or other status data for individual ones of SCPs 441-443. NRF 437 transfers SCP update messages to NRF 417. NRF 417 receives the update messages and responsively maintains SCP profiles for SCPs 441-443.

AMF 411 and SMF 412 register with NRF 417. The registrations indicate NF IDs, NF types, NF addresses, NF geolocations, NF loads, NF capacities, and the like for AMF 411 and SMF 412. NRF 417 responsively maintains NF profiles for AMF 411 and SMF 412 that indicate the NF IDs, NF types, NF addresses, NF geolocations, NF loads, NF capacities, and/or other status information. NRF 417 transfers registration update messages to NRF 437. The registration update messages indicate the NF profiles for AMF 411 and SMF 412. NRF 437 maintains NF profiles for AMF 411 and SMF 412.

NRF 417 prioritizes SCPs 421-423 and SCPs 441-443 for AMF 411 based on the load, capacity, geographic location of SCPs 421-423 and SCPs 441-443, and the geographic location of AMF 411. NRF 417 prioritizes SCPs 421-423 and SCPs 441-443 for SMF 412 based on the load, capacity, geographic location of SCPs 421-423 and SCPs 441-443, and the geographic location of SMF 412. NRF 417 normalizes the load, capacity, geolocation, and/or other factors for individual ones of SCPs 421-423 and 441-443 into a score to prioritize SCPs 421-423 and 441-443 for AMF 411 and for SMF 412. NRF 417 generates a prioritized list of SCPs 421-423 and 441-443 for AMF 411 based on the SCP prioritization for AMF 411. NRF 417 generates a prioritized list of SCPs 421-423 and 441-443 for SMF 412 based on the SCP prioritization for SMF 412. The prioritized SCP list for AMF 411 gives highest priority to SCP 421. The prioritized SCP list for SMF 412 gives highest priority to SCP 423. NRF 417 transfers the prioritized SCP lists to AMF 411 and SMF 412.

UE 801 attaches to AMF 411 over access node 811. UE 801 transfers a registration request to AMF 411. AMF 411 receives the registration request from UE 801. AMF 411 transfers an authentication request for UE 801 to AUSF 414. AUSF 414 interacts with UDM 416 to authenticate UE 801 and upon authentication, indicates the authentication to AMF 411. AMF 411 interacts with other network functions to authorize UE 801 for network service. Responsive to the authentication and authorization, AMF 411 identifies a UDM function need to retrieve UE context for UE 801. AMF 411 selects SCP 421 to establish communications with a UDM based on the priority, proximity, domain, and load of SCP 421 indicated by the SCP list. AMF 411 transfers an NF discovery requests for a UDM to SCP 421. SCPs 421 identifies UDM 416 and forwards the NF discovery requests to UDM 416. UDM 416 transfers a response to AMF 411 to establish communications. AMF 411 retrieves UE context for UE 801 from UDM 416. The UE context comprises QoS, slice IDs, network addresses, and the like. AMF 411 transfers the UE context to UE 801.

In Region A, SCPs 421-423 transfer status heartbeats to NRF 417. NRF 417 receives the status heartbeats and responsively updates the SCP profiles to indicate updated SCP load, SCP capacity, and/or other updated information for individual ones of SCPs 421-423. NRF 417 transfers status heartbeat messages for SCPs 421-423 to NRF 437. The status heartbeat messages indicate the updated SCP profiles for SCPs 421-423. In response, NRF 437 updates the SCP profiles for SCPs 421-423. In Region B, SCPs 441-443 transfer status heartbeats to NRF 437. NRF 437 receives the status heartbeats and responsively updates the SCP profiles to indicate updated SCP load, SCP capacity, and/or other updated information for individual ones of SCPs 441-443. NRF 437 transfers status heartbeat messages for SCPs 441-443 to NRF 417. The status heartbeat messages indicate the updated SCP profiles for SCPs 441-443. In response, NRF 417 updates the SCP profiles for SCPs 441-443.

NRF 417 reprioritizes SCPs 421-423 and SCPs 441-443 for AMF 411 based on the updated load, updated capacity, updated geographic location of SCPs 421-423 and SCPs 441-443, and the geographic location of AMF 411. NRF 417 reprioritizes SCPs 421-423 and SCPs 441-443 for SMF 412 based on the updated load, updated capacity, updated geographic location of SCPs 421-423 and SCPs 441-443, and the geographic location of SMF 412. NRF 417 normalizes the updated load, capacity, geolocation, and/or other factors for individual ones of SCPs 421-423 and 441-443 into a new score to reprioritize SCPs 421-423 and 441-443 for AMF 411 and for SMF 412. NRF 417 generates a new prioritized list of SCPs 421-423 and 441-443 for AMF 411 based on the SCP prioritization for AMF 411. NRF 417 generates a new prioritized list of SCPs 421-423 and 441-443 for SMF 412 based on the SCP prioritization for SMF 412. The new prioritized SCP list for AMF 411 gives highest priority to SCP 421. The prioritized SCP list for SMF 412 gives highest priority to SCP 422. NRF 417 transfers the prioritized SCP lists to AMF 411 and SMF 412.

A user application in UE 801 executes and UE 801 responsively transfers a Protocol Data Unit (PDU) session request to AMF 411. AMF 411 directs the SMF 412 to establish the PDU session for UE 801. SMF 412 identifies a UDM need to retrieve UE context for UE 801 for the PDU session. SMF selects SCPs 422 based on their updated rank, updated proximity, updated load, and updated capacity of SCP 422 as indicated by the SCP list for SMF 412. Although SCP 422 was indicated with the highest priority, in some examples SMF 412 may select a lower priority SCP when certain prerequisites are met. SMF 412 transfers NF discovery requests for a UDM to SCP 422. SCP 422 identifies the requested NF types as UDM. SCP 422 selects UDM 416 for SMF 412. SCP 422 forwards the NF discovery request to UDM 416. UDM 416 accepts the discovery request and SMF 412 establish communications with UDM 416. SMF 412 retrieves UE context for UE 801 to establish the PDU session and selects UPF 413 to serve the PDU session to UE 801. SMF 412 transfers session context for the PDU session to AMF 411. AMF 411 indicates the session context to UE 801. UE 801 uses the session context to establish the PDU session. UE 801 exchanges user data for the PDU session with UPF 413. UPF 413 exchanges the user data with data network 821.

The wireless data network circuitry described above comprises computer hardware and software that form special-purpose network circuitry to exchange data communications through Session Communication Proxies (SCPs). The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to exchange data communications through SCPs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to transfer data from an Access and Mobility Management Function (AMF) to a target network function, the method comprising:
    Session Communication Proxies (SCPs) generating SCP status information and SCP location information;
    a Network Repository Function (NRF) receiving the SCP status information and the SCP location information;
    the NRF prioritizing the SCPs based on the SCP status information and the SCP location information;
    the NRF indicating the SCP prioritization to the AMF;
    the AMF selecting one of the SCPs based on the SCP prioritization;
    the AMF transferring the data to the selected one of the SCPs; and
    the selected one of the SCPs receiving the data, selecting the target network function, and transferring the data to the target network function.

2. The method of claim 1 wherein:
    the SCPs generating the SCP status information and the SCP location information comprises indicating network domains for the SCPs;
    the NRF prioritizing the SCPs based on the SCP status information and the SCP location information comprises prioritizing the SCPs based on the network domains for the SCPs; and
    the AMF selecting the one of the SCPs based on the SCP prioritization comprises selecting the one of the SCPs using the prioritization based on the network domains for the SCPs.

3. The method of claim 1 wherein:
    the SCPs generating the SCP status information and the SCP location information comprises indicating microprocessor status for the SCPs;
    the NRF prioritizing the SCPs based on the SCP status information and the SCP location information comprises prioritizing the SCPs based on the microprocessor status for the SCPs; and
    the AMF selecting the one of the SCPs based on the SCP prioritization comprises selecting the one of the SCPs using the prioritization based on the microprocessor status for the SCPs.

4. The method of claim 1 wherein:
    the SCPs generating the SCP status information and the SCP location information comprises indicating memory status for the SCPs;
    the NRF prioritizing the SCPs based on the SCP status information and the SCP location information comprises prioritizing the SCPs based on the microprocessor status for the SCPs; and
    the AMF selecting the one of the SCPs based on the SCP prioritization comprises selecting the one of the SCPs using the SCP prioritization based on the memory status for the SCPs.

5. The method of claim 1 wherein:
    the SCPs generating the SCP status information and the SCP location information comprises indicating Input/Output (I/O) status for the SCPs;
    the NRF prioritizing the SCPs based on the SCP status information and the SCP location information comprises prioritizing the SCPs based on the Input/Output (I/O) status for the SCPs; and
    the AMF selecting the one of the SCPs based on the SCP prioritization comprises selecting the one of the SCPs using the SCP prioritization based on the I/O status for the SCPs.

6. The method of claim 1 wherein:
    the SCPs generating the SCP status information and the SCP location information comprises generating heartbeat signals for the SCPs;
    the NRF prioritizing the SCPs based on the SCP status information and the SCP location information comprises prioritizing the SCPs based on the heartbeat signals for the SCPs; and
    the AMF selecting the one of the SCPs based on the SCP prioritization comprises selecting the one of the SCPs using the SCP prioritization based on the heartbeat signals for the SCPs.

7. The method of claim 1 wherein the target network function comprises one of a Session Management Function (SMF), Authentication Server Function (AUSF), a Unified Data Management (UDM), or a Policy Control Function (PCF).

8. A method to transfer data from a source network function to a target network function, the method comprising:
    Session Communication Proxies (SCPs) generating SCP status information and SCP location information;
    a Network Repository Function (NRF) receiving the SCP status information and SCP location information;
    the NRF prioritizing the SCPs based on the SCP status information and the SCP location information;
    the NRF indicating the SCP prioritization to the source network function;
    the source network function selecting one of the SCPs based on the SCP prioritization;

the source network function transferring the data to the selected one of the SCPs; and the selected one of the SCPs receiving the data, selecting the target network function, and transferring the data to the target network function.

9. The method of claim 8 wherein:

the NRF prioritizing the SCPs based on the SCP status information and the SCP location information comprises the NRF prioritizing the SCPs based on source network function proximity to the SCPs; and the source network function selecting the one of the SCPs based on the SCP prioritization comprises selecting the one of the SCPs using the SCP prioritization based on the source network function proximity to the selected one of the SCPs.

10. The method of claim 8 wherein the source network function comprises an Access and Mobility Management Function (AMF).

11. The method of claim 8 wherein the target network function comprises a Unified Data Management (UDM).

12. The method of claim 8 wherein the target network function comprises an Authentication Server Function (AUSF).

13. The method of claim 8 wherein the target network function comprises a Policy Control Function (PCF).

14. The method of claim 8 wherein the target network function comprises a Session Management Function (SMF).

15. A data communication system to transfer data from a source network function to a target network function, the data communication system comprising:

Session Communication Proxies (SCPs) to generate SCP status information and SCP location information;

a Network Repository Function (NRF) to receive the SCP status information and the SCP location information;

the NRF to prioritize the SCPs based on the SCP status information and the SCP location information;

the NRF to indicate the SCP prioritization to the source network function;

the source network function to select one of the SCPs based on the SCP prioritization;

the source network function to transfer the data to the selected one of the SCPs; and the selected one of the SCPs to receive the data, select the target network function, and transfer the data to the target network function.

16. The data communication system of claim 15 wherein:

the NRF to prioritize the SCPs based on the source network function proximity to the SCPs;

the source network function is to select the one of the SCPs using the SCP prioritization based on the source network function proximity to the selected one of the SCPs.

17. The data communication system of claim 15 wherein:

the source network function comprises an Access and Mobility Management Function (AMF); and the target network function comprises one of a Unified Data Management (UDM), Authentication Server Function (AUSF), and a Policy Control Function (PCF).

18. The data communication system of claim 15 wherein the SCP status information comprises microprocessor status for the SCPs.

19. The data communication system of claim 15 wherein the SCP status information comprises memory status for the SCPs.

20. The data communication system of claim 15 wherein source network function comprises an Access and Mobility Management Function (AMF) and the target network function comprises a Session Management Function (SMF).

* * * * *